United States Patent
McKeown et al.

(10) Patent No.: US 9,862,801 B2
(45) Date of Patent: Jan. 9, 2018

(54) POLYMERS, THEIR METHOD OF MANUFACTURE AND USE THEREOF

(71) Applicant: THE UNIVERSITY COURT OF THE UNIVERSITY OF EDINBURGH, Edinburgh (GB)

(72) Inventors: Neil Bruce McKeown, South Glamorgan (GB); Mariolino Carta, South Glamorgan (GB)

(73) Assignee: The University Court of the University of Edinburgh, Edinburgh (GB)

( * ) Notice: Subject to any disclaimer, the term of this patent is extended or adjusted under 35 U.S.C. 154(b) by 0 days.

(21) Appl. No.: 14/933,412

(22) Filed: Nov. 5, 2015

(65) Prior Publication Data

US 2016/0060396 A1    Mar. 3, 2016

Related U.S. Application Data

(62) Division of application No. 13/822,858, filed as application No. PCT/GB2011/051704 on Sep. 12, 2011, now Pat. No. 9,212,261.

(30) Foreign Application Priority Data

Sep. 15, 2010 (GB) .................. 1015401.1

(51) Int. Cl.
| | |
|---|---|
| C08G 73/06 | (2006.01) |
| C08G 73/10 | (2006.01) |
| B01D 71/62 | (2006.01) |
| B01D 71/64 | (2006.01) |
| C08L 79/04 | (2006.01) |
| C08L 79/08 | (2006.01) |
| C08G 69/40 | (2006.01) |
| C08G 73/02 | (2006.01) |
| C08G 69/00 | (2006.01) |

(52) U.S. Cl.
CPC ......... *C08G 73/0694* (2013.01); *B01D 71/62* (2013.01); *B01D 71/64* (2013.01); *C08G 73/1039* (2013.01); *C08G 73/1085* (2013.01); *C08L 79/04* (2013.01); *C08L 79/08* (2013.01)

(58) Field of Classification Search
CPC ...................................................... C08G 73/06
USPC .............. 528/210, 339, 423, 422, 190, 353; 525/436, 534; 521/25
See application file for complete search history.

(56) References Cited

U.S. PATENT DOCUMENTS

2007/0140907 A1    6/2007  Rakow et al.
2009/0057233 A1    3/2009  Redko et al.

OTHER PUBLICATIONS

Xin Du et al.: "Troger's base—functionalised organic nanoporous polymer for heterogeneous catalysis," Chem. Commun., vol. 46, 2010, pp. 970-972.
Amir Abdolmaleki et al.: "Noncoplanar rigid-rod aromatic polyhydrazides containing Troger's base," Jounal of Applied Polymer Science, vol. 122, 2011, pp. 282-288.
R.J. Warr et al.: "Inorganic asymmetric synthesis: diastereoselective syntheses of mono- and dinuclear complexes pontaining octahedral, two-bladed propeller, Bis(pyridine-2-aldehyde 2'-pyridylhydrazone)iron(II) stereocenters, Inorganic Chemistry," 2008, vol. 47, No. 20, pp. 9351-9362.
U. Kiehne et al.: "Diastereoselective self-assembly of double-stranded helicates from Troger's base derivatives," Organic Letters, 2007, vol. 9, No. 7, pp. 1283-1286.
International Search Report and Written Opinion, Application No. PCT/GB2011/051704, dated Jan. 4, 2012.

*Primary Examiner* — Duc Truong
(74) *Attorney, Agent, or Firm* — Louis F. Wagner; FisherBroyles, LLP

(57) ABSTRACT

A method for the manufacture of a polymer is provided, the method comprising:
Providing a first monomer, the first monomer comprising a bicyclic diamine moiety, a first nucleophilic group provided on a carbon atom of an aromatic moiety, and a second nucleophilic group provided on a carbon atom of an aromatic moiety;
Providing a bridging compound comprising at least two sites vulnerable to nucleophilic attack; and
Contacting the first monomer with the bridging compound. Polymers made by said method and uses of such polymers are also disclosed.

13 Claims, No Drawings

POLYMERS, THEIR METHOD OF MANUFACTURE AND USE THEREOF

This application is a DIV of Ser. No. 13/822,858 filed on Mar. 13, 2013, now U.S. Pat. No. 9,212,261.

The present invention relates to polymers comprising bicyclic diamine groups or quaternary ammonium ions derived therefrom, their method of manufacture and use thereof.

Polymers comprising bicyclic diamine moieties are known (for example, see "Troger's base-functionalised organic nanoporous polymer for heterogeneous catalysis", Xin Du et al., Chem. Commun., 2010, vol. 46, 970-972).

The present invention provides alternative polymers to those known polymers and provides alternative ways of making bicyclic diamine polymers.

In accordance with a first aspect of the present invention, there is provided a method for the manufacture of a polymer, the method comprising:
Providing a first monomer, the first monomer comprising a bicyclic diamine moiety, a first nucleophilic group provided on a carbon atom of an aromatic moiety, and a second nucleophilic group provided on a carbon atom of an aromatic moiety;
Providing a bridging compound comprising at least two sites vulnerable to nucleophilic attack; and
Contacting the first monomer with the bridging compound.

The method of the first aspect of the invention provides a convenient and effective method for making polymers comprising bicyclic diamine groups.

The first monomer may be provided with no further nucleophilic groups capable of forming bonds with the sites of the bridging compounds which are vulnerable to nucleophilic attack. If this is the case, it is preferred that the bridging compound comprises only two sites vulnerable to nucleophilic attack by the first and second nucleophilic groups provided on the first monomer. Such a method is suitable for forming non-network polymers. Those skilled in the art will realise that the first monomer may comprise more than two nucleophilic groups, but that only two of those nucleophilic groups are capable of forming bonds bridging compound under the reaction conditions used. Likewise, those skilled in the art will realise that the bridging compound may comprise more than two sites vulnerable to nucleophilic attack, but that only two sites are vulnerable to attack by the nucleophilic groups of the first monomer under the reaction conditions used.

The first monomer may be provided with a third nucleophilic group provided on a carbon atom of an aromatic moiety. The first monomer may be provided with a fourth nucleophilic group provided on a carbon atom of an aromatic moiety. It is preferred that the first and third nucleophilic groups are provided on the same aromatic moiety, and preferably on adjacent carbon atoms of the same aromatic moiety. It is further preferred that the second and fourth nucleophilic groups are provided on the same aromatic moiety and preferably on adjacent carbon atoms of the same aromatic moiety.

If the first monomer is provided with first, second, third and fourth nucleophilic groups, then the bridging compound may comprise at least four sites vulnerable to nucleophilic attack.

Those skilled in the art will realise that each site which is vulnerable to nucleophilic attack is preferably capable of forming one (and only one) covalent bond with a nucleophilic group. Those skilled in the art will also realise, however, that each site which is vulnerable to nucleophilic attack may be capable of forming two covalent bonds, one bond with each of two nucleophilic groups. Those skilled in the art will realise that the method of the present invention is applicable to bridging compounds comprising one site which is vulnerable to nucleophilic attack, if that one site is capable of forming two covalent bonds, one bond with each of two nucleophilic groups.

One or more (and preferably more than one and further preferably each) of the sites vulnerable to nucleophilic attack are atoms (preferably carbon atoms) that form part of an aromatic moiety or are atoms (preferably carbon atoms) which are attached directly to an aromatic moiety by a single covalent bond. The word "directly" indicates that there are no atoms between the atom (preferably carbon atom) vulnerable to nucleophilic attack and the aromatic moiety. For example, one site vulnerable to nucleophilic attack may be a carbon atom that forms part of an aromatic moiety and one site vulnerable to nucleophilic attack may be a carbon atom directly attached to an aromatic moiety.

The first, second, (and third and fourth, if present) nucleophilic groups may be the same or different and may comprise any suitable nucleophilic group. Preferred nucleophilic groups include —OH, —SH and —NH$_2$ or their deprotonated forms.

The first nucleophilic group may be attached to a carbon atom of an aromatic six membered carbon ring. The six membered carbon ring may be provided with substituents other than the first nucleophilic group. If the first monomer comprises a third nucleophilic group, then the third nucleophilic group may be provided on the same aromatic six membered carbon ring as the first nucleophilic group. The first and third nucleophilic groups may be attached to adjacent carbon atoms. It is further preferred that the aromatic six membered carbon ring forms part of the structure of the bicyclic diamine moiety.

The second nucleophilic group may be attached to a carbon atom of an aromatic six membered carbon ring. The six membered carbon ring may be provided with substituents other than the second nucleophilic group. If the first monomer comprises a fourth nucleophilic group, then the fourth nucleophilic group may be provided on the same aromatic six membered carbon ring as the second nucleophilic group. The second and fourth nucleophilic groups may be attached to adjacent carbon atoms. It is further preferred that the aromatic six membered carbon ring forms part of the structure of the bicyclic diamine moiety.

The bicylic diamine moiety may comprise a nine membered bicyclic structure i.e. nine atoms form the bicyclic structure (this does not include any atoms which are bonded to the ring structure, but do not form part of the ring).

The first monomer may comprise the moiety shown below:

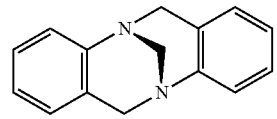

Structure 1

Or its stereoisomer,

Which may be substituted or unsubstituted.

In practice, a mixture of stereoisomers is likely to be contacted with the bridging compound.

The moiety preferably comprises the first and second nucleophilic groups (and the third and fourth nucleophilic groups, if present).

The first nucleophilic group may be provided on one of the aromatic moieties of Structure 1 and the second nucleophilic group may be provided on the other of the aromatic moieties of Structure 1.

If the moiety comprises third and fourth nucleophilic groups, the first monomer may comprise the structure shown below:

Structure 2

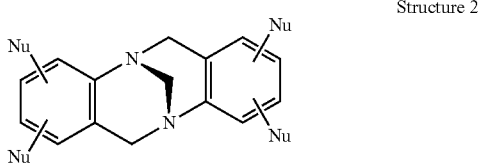

Or its stereoisomer,

Which may be substituted or unsubstituted, wherein Nu is a nucleophilic group, wherein each of the Nu groups may be the same or different.

As indicated above, in practice, a mixture of stereoisomers is likely to be contacted with the bridging compound.

The first monomer may comprise the structure shown below:

Structure 3

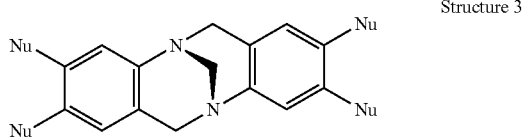

Or its stereoisomer,

Which may be substituted or unsubstituted, wherein Nu is a Nucleophilic group, wherein each of the Nu groups may be the same or different.

Once again, in practice, a mixture of stereoisomers is likely to be contacted with the bridging compound.

For the avoidance of doubt, it is hereby stated that the first monomer may be provided with more than four nucleophilic groups. This is particularly desirable when making a networked polymer. In this case, it may be preferable that the bridging group is provided with more than four sites vulnerable to nucleophilic attack.

One or more leaving groups may be attached to one or more of the sites vulnerable to nucleophilic attack. Each leaving group may be the same or different and may comprise any suitable leaving group. Preferred leaving groups include halo (for example, —F, —Cl, —Br and —I), tosylate, —NH$_2$, —OH, triflate, —OPh and the anhydride of an aromatic o-dicarboxylic acid.

The first and second sites vulnerable to nucleophilic attack may be provided by the same aromatic moiety or by carbon atoms, each of which is directly attached by a single covalent bond to the same aromatic moiety. The aromatic moiety may comprise an aromatic six membered carbon ring moiety, which may optionally be further substituted or may or may form part of a larger aromatic ring system (for example, the six membered carbon ring moiety may be part of a phthalocyanine or anthracene moiety).

The first and second sites vulnerable to nucleophilic attack may be provided by different aromatic moieties (i.e. the first site is provided by a carbon atom of a first aromatic moiety and the second site is provided by a carbon atom of a second aromatic moiety, the second aromatic moiety not being the first aromatic moiety) or by carbon atoms directly attached (i.e. by a single covalent bond) to different aromatic moieties (for example, the first site may be provided by a carbon atom directly attached by a single covalent bond to a first aromatic moiety and the second site may be provided by a carbon atom directly attached by a single covalent bond to a second aromatic moiety, the second aromatic moiety not being the first aromatic moeity). It is preferred that the first aromatic moiety and the second aromatic moiety referred to above are aromatic six membered carbon ring moieties, either or both of which may optionally be further substituted or may or may form part of a larger aromatic ring system (for example, the six membered carbon ring moiety may be part of a phthalocyanine or anthracene moiety).

If the first monomer comprises third and fourth sites vulnerable to nucleophilic attack, then it is preferred that the first and third sites are provided by the same aromatic moiety. If the first monomer comprises third and fourth sites vulnerably to nucleophilic attack, then it is preferred that the second and fourth sites are provided by the same aromatic moiety, but that this aromatic moiety is different from the aromatic moiety provided with the first and third sites.

The third and fourth sites vulnerable to nucleophilic attack may be provided by carbon atoms, each of which is attached directly by a single covalent bond to different aromatic six membered carbon ring moieties, either or both of which may optionally be further substituted or may form part of a larger aromatic ring system (for example, the six membered carbon ring moiety may be part of a phthalocyanine or anthracene moiety).

The first and third sites may be provided by adjacent carbon atoms of an aromatic moiety.

The first and third sites may be provided by an aromatic six membered carbon ring moiety (preferably by adjacent atoms of an aromatic six membered ring moiety), which may optionally be further substituted or may or may form part of a larger aromatic ring system (for example, the six membered carbon ring moiety may be part of a phthalocyanine or anthracene moiety).

The first and third sites vulnerable to nucleophilic attack may be provided by carbon atoms, each of which is attached directly by a single covalent bond to an aromatic six membered carbon ring moiety, (preferably attached to adjacent atoms of an aromatic six membered ring moiety), either or both of which may optionally be further substituted or may form part of a larger aromatic ring system (for example, the six membered carbon ring moiety may be part of a phthalocyanine or anthracene moiety). The first and third sites may be provided by carbon atoms attached to the same or different aromatic moieties.

The second and fourth sites vulnerable to nucleophilic attack may be provided by adjacent carbon atoms of an aromatic moiety.

The second and fourth sites vulnerable to nucleophilic attack may be provided by an aromatic six membered carbon ring moiety (preferably by adjacent atoms of an aromatic six membered ring moiety), which may optionally be further substituted or may or may form part of a larger aromatic ring system (for example, the six membered carbon ring moiety may be part of a phthalocyanine or anthracene moiety).

The second and fourth sites vulnerable to nucleophilic attack may be provided by carbon atoms, each of which is attached directly by a single covalent bond to an aromatic six membered carbon ring moiety, (preferably attached to adjacent atoms of an aromatic six membered ring moiety). Said aromatic six membered carbon ring moiety or moieties may optionally be further substituted or may or may form part of a larger aromatic ring system (for example, the six membered carbon ring moiety may be part of a phthalocyanine or anthracene moiety). The second and fourth sites may be provided by carbon atoms attached to the same or different aromatic moieties.

The bridging compound may comprise fifth and optionally sixth sites vulnerable to nucleophilic attack. If the bridging compound comprises fifth and sixth sites vulnerable to nucleophilic attack, the fifth and sixth sites may be provided by carbon atoms of the same or different aromatic moieties. The fifth and sixth sites may be provided by adjacent atoms of an aromatic moiety. The provision of a third pair of sites which is vulnerable to nucleophilic attack facilitates the formation of branched and cross-linked polymers. The fifth and sixth sites may be provided by an aromatic six membered carbon ring moiety, which may optionally be provided with further substituents or may form part of a larger aromatic system (for example, the six membered carbon ring moiety may be part of a phthalocyanine or anthracene moiety).

The bridging compound may comprise fifth and optionally sixth sites vulnerable to nucleophilic attack, each of which may be provided by carbon atoms which are attached directly by a single covalent bond to an aromatic six membered carbon ring moiety, (preferably attached to adjacent atoms of an aromatic six membered ring moiety). The fifth and sixth sites may be provided by carbon atoms attached to the same or different aromatic moieties, one (or both of which, if two aromatic moieties are present) may optionally be further substituted or may form part of a larger aromatic ring system (for example, the six membered carbon ring moiety may be part of a phthalocyanine or anthracene moiety).

Those skilled in the art will realise that the first monomer and the bridging compound should be brought into contact with each other in conditions under which nucleophilic substitution may take place (for example, in a solution of potassium carbonate at 60° C. for 48 hours).

The method may comprise providing a second monomer, the second monomer being different from the first monomer and comprising first and second nucleophilic groups. The use of a second monomer facilitates the formation of heteropolymers.

The method may comprise contacting the second monomer with the first monomer and the bridging compound.

Whilst the second monomer may be structurally different from the first monomer, the second monomer may have the same general features of the first monomer as described above.

The second monomer may comprise third and optionally fourth nucleophilic groups.

The first and second (and third and fourth, if present) nucleophilic groups provided on the second monomer may be the same or different.

If the second monomer comprises a third nucleophilic group, it is further preferred that the first and third nucleophilic groups are provided on the same aromatic moiety and are preferably provided on adjacent carbon atoms, preferably on adjacent carbon atoms of an aromatic six membered carbon ring moiety, which may optionally be further substituted or may or may form part of a larger aromatic ring system (for example, the six membered carbon ring moiety may be part of a phthalocyanine or anthracene moiety).

If the second monomer comprises a fourth nucleophilic group, it is further preferred that the second and fourth nucleophilic groups are provided on the same aromatic moiety and are preferably provided on adjacent carbon atoms, preferably on adjacent carbon atoms of an aromatic six membered carbon ring moiety, which may optionally be further substituted or may or may form part of a larger aromatic ring system (for example, the six membered carbon ring moiety may be part of a phthalocyanine or anthracene moiety).

The second monomer may comprise a bicyclic diamine group. Alternatively and preferably the second monomer does not comprise a bicyclic diamine group.

It is preferred that the second monomer comprises a non-planar ring structure, such as a bicycloalkane (for example, bicyclooctane) or a point of contortion, such as that provided by a spiro group.

The method may comprise forming a polymer comprising multiple bicyclic diamine moieties and subsequently forming therefrom a polymer comprising multiple quaternary ammonium cations. This may be achieved by forming quaternary ammonium groups from the amine groups of the polymer. This may typically be achieved, for example, by reacting the polymeric bicyclic diamine with an alkyl halide (such as methyl iodide or dimethyl sulfate).

The formation of the quaternary ammonium cation groups may also form cross-links in the polymer. The may be achieved, for example, by reacting the polymeric bicyclic diamine with an alkyl dihalide, such as 1,6-dibromohexane or $\alpha,\alpha$-dibromo-p-xylene.

The method may comprise forming a polymer comprising quaternary ammonium cations with a first counter-anion and exchanging said first counter-anion for a second counter-anion. For example, it may be convenient to form the polymer with a bromide counter-anion, and then to perform anion exchange to introduce a different counter-anion to the polymer.

The average degree of polymerisation may be 10 or more, optionally 15 or more, preferably 20 or more and more preferably 50 or more.

In accordance with a second aspect of the present invention, there is provided a polymer producible using the method of the first aspect of the present invention.

In accordance with a third aspect of the present invention, there is provided a polymer comprising a first repeat unit comprising a bicyclic diamine moiety or a quaternary ammonium cation derivative thereof, the first repeat unit comprising the bicyclic diamine moiety (or quaternary ammonium cation derivative thereof) being bonded to a second repeat unit and a third repeat unit, the second and third repeat unit being the same as, or different from, the first repeat unit.

The polymer of the third aspect of the present invention is preferably a non-network polymer. It is preferred that the polymer of the third aspect of the present invention comprises a linear or ring polymer.

The first repeat unit may be bonded to the second repeat unit by a single bond (which may be a single, double or triple covalent bond).

The first repeat unit may be bonded to the third repeat unit by a single bond (which may be a single, double or triple covalent bond).

In this case, it is preferred that the polymer does not comprise any further e.g. fourth repeat units. For example, it is preferred that the polymer comprises a first repeat unit attached to a second repeat unit and a third repeat unit, but not attached to any further repeat unit. The presence of a further repeat unit is indicative of the ability of the polymer to cross-link, which may be undesirable.

The first repeat unit may be bonded by two covalent bonds to each of the second repeat unit and the third repeat unit.

In this case, for the avoidance of uncertainty, it is hereby stated that two bonds between the first repeat unit and the second repeat unit indicates that there is a bond between a first pair of atoms and a bond between a second pair of atoms (the second pair being different from the first pair). Two bonds between the first repeat unit and the second repeat unit does not include a double bond between a single pair of atoms.

Likewise, for the avoidance of uncertainty, it is hereby stated that two bonds between the first repeat unit and the third repeat unit indicates that there is a bond between a first pair of atoms and a bond between a second pair of atoms (the second pair being different from the first pair). Two bonds between the first repeat unit and the third repeat unit does not include a double bond between a single pair of atoms.

The second and third units may be the same as the first unit.

One or both of the second and third units may be different from the first repeat unit.

The polymer may be a heteropolymer or a homopolymer. If the polymer is a heteropolymer, it may be a block heteropolymer, a random heteropolymer or an alternating heteropolymer.

The first repeat unit may be bonded to a fourth repeat unit which may be the same or different from the first, second or third repeat unit. The first repeat unit may be bonded by two covalent bonds to the fourth repeat unit.

The polymer may comprise at least 30% by mole of the first repeat unit (or the first repeat unit and one or more of the second repeat unit, the third repeat unit and fourth repeat unit (if present), if the one or more of the second repeat unit, the third repeat unit and the fourth repeat unit (if present) are the same as the first repeat unit).

The polymer may comprise at least 40% by mole of the first repeat unit (or the first repeat unit and one or more of the second repeat unit, the third repeat unit and fourth repeat unit (if present), if the one or more of the second repeat unit, the third repeat unit and the fourth repeat unit (if present) are the same as the first repeat unit).

The polymer may comprise at least 50% by mole of the first repeat unit (or the first repeat unit and one or more of the second repeat unit, the third repeat unit and fourth repeat unit (if present), if the one or more of the second repeat unit, the third repeat unit and fourth repeat unit (if present) are the same as the first repeat unit).

The polymer may comprise at least 60% by mole of the first repeat unit (or the first repeat unit and one or more of the second repeat unit, the third repeat unit and the fourth repeat unit (if present), if the one or more of the second repeat unit, the third repeat unit and the fourth repeat unit (if present) are the same as the first repeat unit).

The polymer may comprise at least 70% by mole of the first repeat unit (or the first repeat unit and one or more of the second repeat unit, the third repeat unit and the fourth repeat unit (if present), if the one or more of the second repeat unit, the third repeat unit and the fourth repeat unit (if present) are the same as the first repeat unit).

The polymer may be linear, branched, cross-linked or cyclic.

The first repeat unit may comprise a moiety of general structure 4

Structure 4

Or its stereoisomer.

Or the quaternary ammonium cation derivative of Structure 4 or its stereoisomer.

Wherein A and B indicate the bonding points to a first aromatic moiety and wherein X and Y indicate the bonding points to a second aromatic moiety.

Said first aromatic moiety and said second preferably comprise an aromatic six membered carbon ring.

The first repeat unit may be of general structure 5:

Structure 5

Or its stereoisomer.

Or the quaternary ammonium cation derivative of Structure 5 or its stereoisomer, Which may be substituted or unsubstituted, and wherein each X is independently selected from O, S, NH and NR where R is alkyl or aryl.

If different from the first repeat unit, the second, third or fourth repeat unit (if present) may be of general structure 6:

Structure 6

Which may be substituted or unsubstituted, and wherein each X is independently selected from O, S, NH and NR where R is alkyl.

If one or more of the second, third and fourth (if present) repeat units is different from the first repeat unit, said repeat unit (which is different from the first repeat unit) may comprise a non-planar ring structure, such as a bicycloalkane (for example, bicyclooctane) or a point of contortion, such as that provided by a spiro group.

In accordance with the fourth aspect of the present invention, there is provided a microporous material, comprising a polymer in accordance with the second or third aspects of the present invention.

For the avoidance of doubt, it is hereby stated that microporous material refers to a material possessing an interconnect system of voids of diameter less than 2 nm as defined by the International Union of Pure and Applied Chemistry. Such microporosity can be demonstrated by a high apparent surface area (e.g. greater than 150 m$^2$ g$^{-1}$) as determined by application of the BET model (or similar analysis) to low-pressure nitrogen or carbon dioxide adsorption data obtained at 77 K.

In accordance with a fifth aspect of the present invention, there is provided a separation membrane for separating first and second components, the separation membrane comprising a polymer in accordance with the second or third aspects of the present invention.

The separation membrane may be suitable for the separation of gases (e.g. $CO_2$ from $CH_4$, $CO_2$ form $H_2$, $CO_2$ from $N_2$, $O_2$ from $N_2$ etc.) or the purification of water.

In accordance with a sixth aspect of the present invention, there is provided an adsorbent material comprising a polymer in accordance with the second or third aspects of the present invention. The adsorbent material may be suitable for the adsorption of gases such as hydrogen, methane or carbon dioxide or toxic or odorous compounds or metal cations or metal nanoparticles. The adsorption of the gases or toxic or odours gases may be enhanced by the prior incorporation of the metal cations. The adsorbent material may be for use in gas separation, for example, in pressure or vacuum swing adsorption.

In accordance with a seventh aspect of the present invention, there is provided an optical sensor comprising a polymer in accordance with the second or third aspects of the present invention. Such an optical sensor is described in US2007/0140907 to Rakow et al. For example, the polymer of the second and third aspects of the present invention may be included in the active layers of a sensor.

In accordance with an eighth aspect of the present invention, there is provided a proton exchange membrane comprising a polymer in accordance with the second or third aspects of the present invention. Such a proton exchange membrane may be incorporated into a fuel cell.

In accordance with a ninth aspect of the present invention, there is provided a method of making a catalyst, the method comprising:
  (i) Providing a metal having catalytic activity; and
  (ii) Contacting the metal with a polymer in accordance with the second or third aspects of the present invention.

In accordance with a tenth aspect of the present invention, there is provided a catalyst comprising a polymer in accordance with the second or third aspects of the present invention and a catalytic metal ligated to said polymer.

In accordance with an eleventh aspect of the present invention, there is provided a catalytic material comprising a negatively charged catalyst and a polymer in accordance with the second or third aspects of the present invention.

In accordance with an twelfth aspect of the present invention, there is provided an ion exchange resin comprising a polymer in accordance with the second or third aspects of the present invention.

In accordance with a thirteenth aspect of the present invention, there is provided a chiral substrate for the separation of enantiomers, the chiral substrate comprising a polymer in accordance with the second or third aspects of the present invention. In order to produce a chiral polymer, the polymer would be produced using one of the two stereoisomers of the monomer.

In accordance with a fourteenth aspect of the present invention, there is provided an anion exchange membrane, the anion exchange membrane comprising a polymer in accordance with the second or third aspects of the present invention.

The invention will now be described by way of example only.

EXAMPLE 1

A monomer comprising a bicyclic diamine structure and four nucleophilic groups may be prepared as indicated in reaction scheme 1. A catechol derivative 1 (Sigma Aldrich, UK) is mixed with paraformaldehyde under acidic conditions (paraformaldehyde, trifluoroacetic acid, room temperature, 24 hours) to form monomer 2. The monomer 2 may be demethylated ($BBr_3$ in $CH_2Cl_2$ for four hours) to produce monomer 3 (2,3,8,9-tetrahydroxy-6H,12H-5,11-methanodibenzo[1,5]-diazocine). Those skilled in the art will realise that both stereoisomers of compounds 2 and 3 will be formed in the reaction mixture.

Reaction Scheme 1

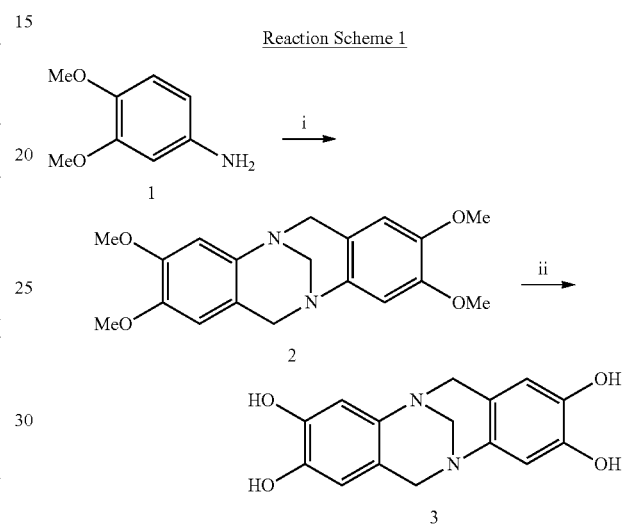

Monomer 3 may then be reacted with 2,3,5,6-tetrafluoroterephthalonitrile as shown in Reaction Scheme 2 to form a polymer 4 in accordance with the present invention.

Reaction Scheme 2

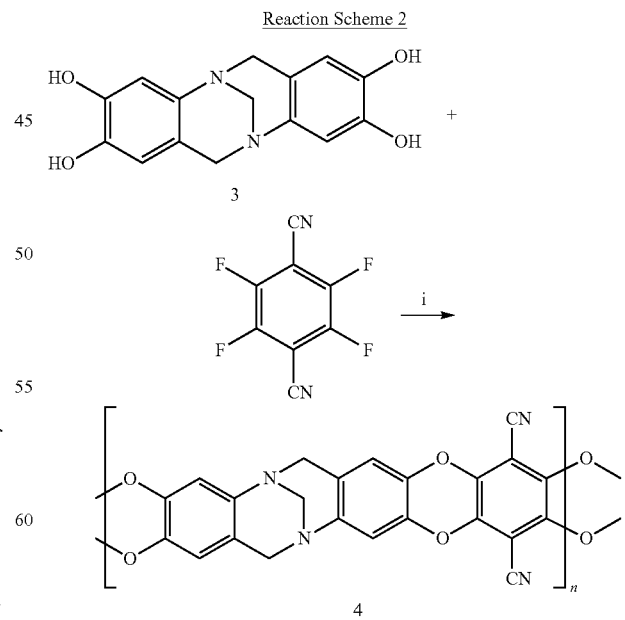

2,3,8,9-Tetrahydroxy-6H,12H-5,11-methanodibenzo[1,5]-diazocine (1.000 g, 3.49 mmol) and 2,3,5,6-tetrafluoroterephthalonitrile (698 mg, 3.49 mmol, Sigma Aldrich, UK) were added to a two-necked round bottom flask, under inert atmosphere, in dry dimethylformamide (25 mL). The mixture was heated to 65° C., until the two starting materials were completely dissolved, then dry potassium carbonate (3.85 g, 27.92 mmol, 8 equivalents) was added and the mixture kept stirred for 96 h. The solution was quenched with water (80 mL), filtrated and washed repeatedly with water and acetone then filtered and dried under high vacuum to give a yellow solid (1.13 g, 80% based on the molecular weight of the repeated unit). BET surface area=570 m$^2$/g;

The product was collected by filtration and was dried under high vacuum overnight to give the final product as yellow solid (85% yield). $^1$H NMR (400 MHz; CDCl$_3$) δ 6.82 (br m, 4H), 6.61 (br s, 2H), 6.42 (br s, 2H), 4.56 (br s, 2H), 4.24 (br s, 2H), 4.01 (br s, 2H), 2.35 (br s, 2H), 2.17 (br s, 2H), 1.34 (br m, 12H); BET surface area=633 m$^2$/g; total pore volume=0.42 cm$^3$/g at (P/P$_0$) 0.98, adsorption; TGA analysis (nitrogen): 5% loss of weight occurred at ~380° C. Initial weight loss due to thermal degradation commences at ~450° C. Those skilled in the art will realise that polymer 6 will comprise both stereoisomers of the bicyclo diamine group.

Reaction Scheme 3

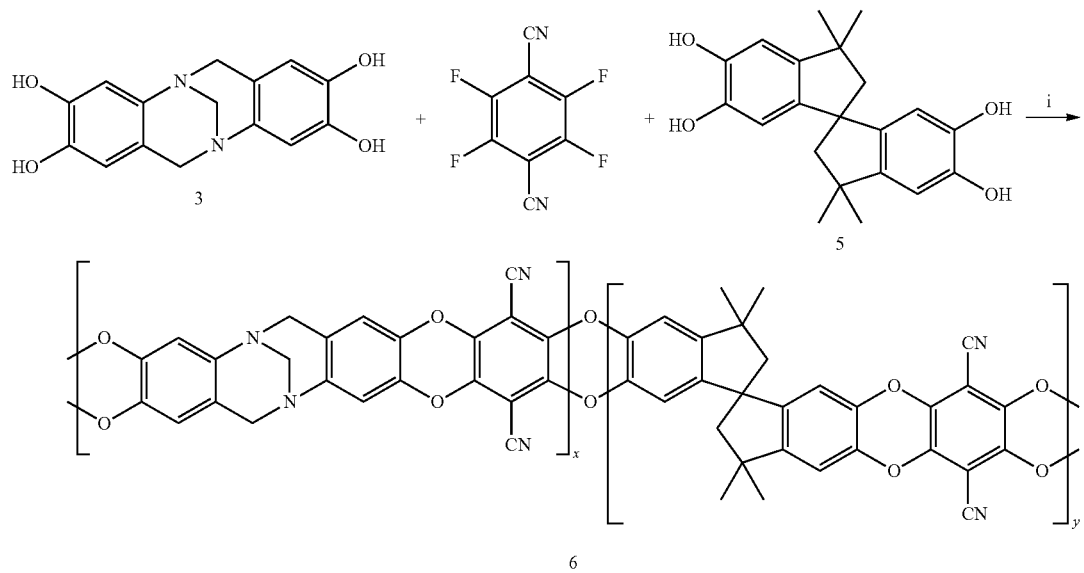

total pore volume=0.35 cm$^3$/g at (P/P$_0$) 0.98, adsorption; TGA analysis (nitrogen): 5% loss of weight occurred at ~380° C. Initial weight loss due to thermal degradation commences at ~440° C. Those skilled in the art will realise that polymer 4 will comprise both stereoisomers of the bicyclo diamine group.

EXAMPLE 2

The general principle of Example 1 may be used to make heteropolymers. For example, monomer 3 may be reacted with 2,3,5,6-tetrafluoroterephthalonitrile in the presence of spiro monomer 5 as shown in Reaction Scheme 3 to produce polymer 6 in accordance with the present invention.

2,3,8,9-Tetrahydroxy-6H,12H-5,11-methanodibenzo[1,5]-diazocine (400 mg, 1.397 mmol), 3,3,3',3'-tetramethyl-2,2',3,3'-tetrahydro-1,1'-spirobi[indene]-5,5',6,6'-tetraol (476 mg, 1.397 mmol, Sigma Aldrich, UK), 2,3,5,6-tetrafluoro-terephthalonitrile (559 mg, 2.794 mmol) were added to a two-necked round bottom flask, under inert atmosphere, in dry dimethylformamide (25 mL). The mixture was heated to 65° C., until the two starting materials were completely dissolved, then dry potassium carbonate (3.08 g, 22.35 mmol, 8 equivalents) was added and the mixture stirred for 96 h. The reaction mixture was quenched with water (60 mL), and the resulting precipitate filtrated and washed repeatedly with water and acetone. The solid was dissolved in THF (15 mL), filtered through cotton wool, poured into a flask containing a mixture of acetone/methanol (2/1, 40 ml).

EXAMPLE 3

A monomer comprising a bicyclic diamine structure and two nucleophilic groups may be prepared as indicated in reaction scheme 4. A dinitro derivative of 5,11-methanodibenzo[1,5]-diazocine catechol is made by mixing nitroaniline with paraformaldehyde under acidic conditions (paraformaldehyde, trifluoroacetic acid, room temperature, 24 hours) to form monomer 7. The monomer 7 may be reduced to produce monomer 8. The synthesis of monomer 8 was disclosed by Kiehne et al., (*Org. Lett.* 2007, 9, 1283)

Reaction Scheme 4

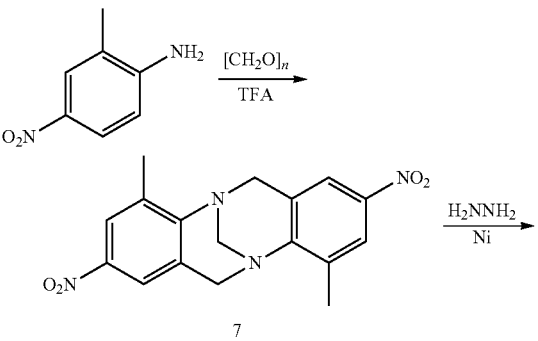

-continued

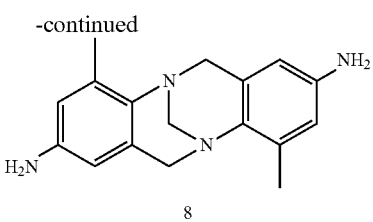

8

Monomer 8 may then be reacted with bisanhydride 9 as shown in Reaction Scheme 5 to form a polymer in accordance with the present invention.

7.07 (br s, 2H, Ar), 6.82 (br s, 2H, Ar), 4.67-4.64 (br d, 2H, N—CH$_2$), 4.31 (br s, 2H, N—CH$_2$), 4.09-4.05 (br d, 2H, N—CH$_2$), 2.54-2.34 (br m, 4H CH$_2$, 6H CH$_3$), 1.48-1.42 (br m, 12H, CH$_3$); IR (NaCl, CH$_2$Cl$_3$/cm$^{-1}$): 1774.7 (asym C=O), 1713.9 (sym C=O), 1388.0 (C—N), 748.2 (imide ring deformation); Molecular mass: (GPC, eluent—CHCl$_3$, against polystyrene standards: M$_w$=46600, PDI=2.08. BET surface area=590.93 m$^2$/g; total pore volume=0.73 cm$^3$/g at (P/P$_0$) 0.98, adsorption; TGA analysis (nitrogen): Initial weight loss due to thermal degradation commences at ~490° C.

Reaction Scheme 5

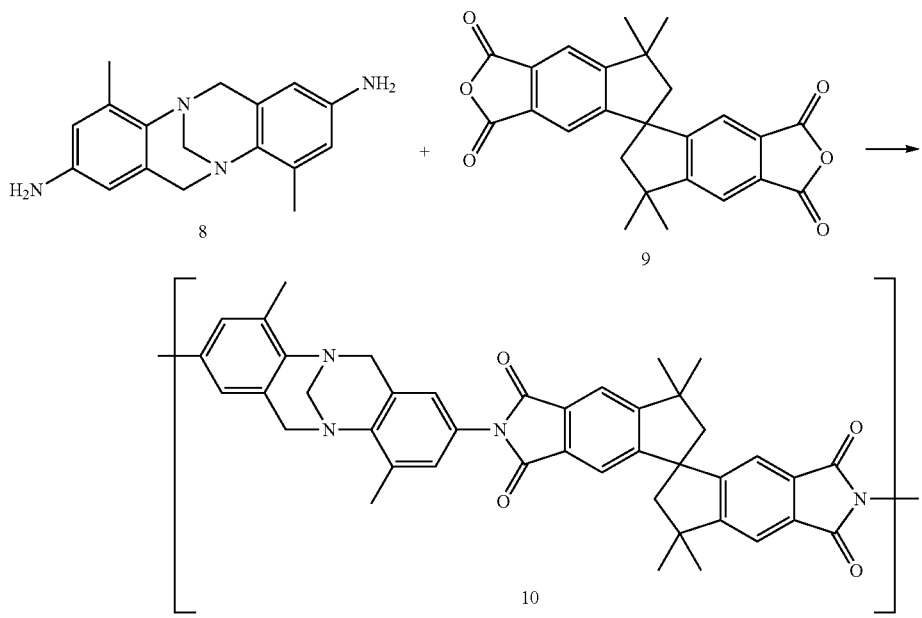

Bisanhydride 9 was prepared from 3,3,3'3',5,5',6,6'-hexamethyl-1,1'-spirobisindane, itself prepared by the modification of the procedure described by Warr et al. in Inorganic Chemistry 2008, 47, 9351, by oxidation using an aqueous solution of potassium permanganate, followed by dehydration of the resulting tetra-carboxylic acid by refluxing in acetic anhydride.

The reaction is carried out in a round bottom flask, equipped with Dean-Stark apparatus under nitrogen atmosphere. The monomer 9 (641.7 mg, 1.54 mmol) is dissolved in ethanol (EtOH) (9.6 ml) and triethylamine (0.78 ml) and refluxed for 1 h to form ester-acid precursor. Then the excess of solvents is distilled to give a high viscous liquid. Monomer 8 (431.9 mg, 1.54 mmol) is dissolved in NMP/o-dichlorobenzene (o-DCB) mixture (2 ml, NMP/o-DCB=4:1) and added to ester-acid precursor. A container with monomer 8 is rinsed with NMP/o-DCB (3 ml). The reaction is kept under vigorous stirring for 0.5 h at 20° C. and then temperature is raised gradually to 200° C. After 24 h the reaction is cooled to 20° C. and 5 ml of CHCl$_3$ is added to dilute the reaction mixture. The resulting solution is poured slowly into EtOH (150 ml) to precipitate desirable polymer 12. The precipitated solid is filtered off to give a pale-yellow powder. Polymer 10 is reprecipitated from chloroform into EtOH and dried under reduced pressure at 120° C. for 10 h (yield 870 mg, 81% after the second precipitation). $^1$H NMR (400 MHz; CDCl$_3$) δ ppm: 7.76 (br s, 2H, Ar), 7.30 (br s, 2H, Ar),

EXAMPLE 4

Monomer 8 described in Example 3 might be reacted with commercially available hexafluoroisopropylidene bisphthalic dianhydride (6-FDA) comonomer 13 (Aldrich) as shown in Reaction Scheme 6 to form a polymer 14 in accordance with the present invention.

Reaction Scheme 6

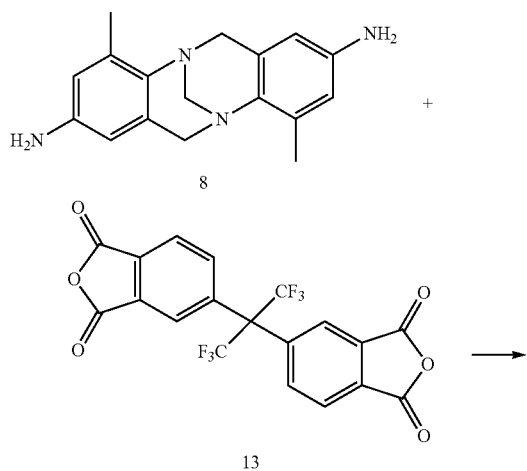

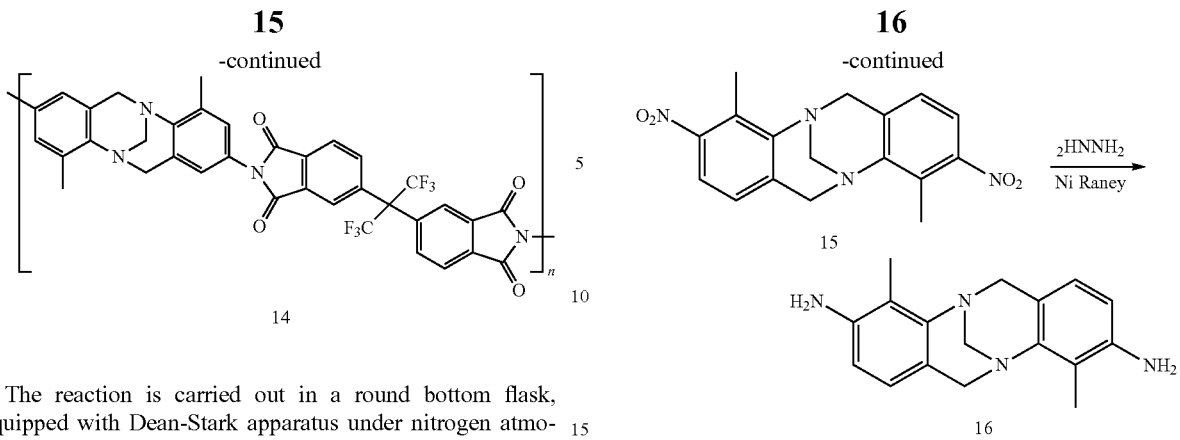

The reaction is carried out in a round bottom flask, equipped with Dean-Stark apparatus under nitrogen atmosphere. The co-monomer 13 (604.8 mg, 1.35 mmol) is dissolved in ethanol (EtOH) (10 ml) and triethylamine (0.8 ml) and refluxed for 1 h to form ester-acid precursor. Then the excess of solvents is distilled to give a high viscous liquid. The comonomer 8 (381.2 mg, 1.35 mmol) is dissolved in NMP/o-diclorobenzene (o-DCB) mixture (2 ml, NMP/o-DCB=4:1) and added to ester-acid precursor. A container with co-monomer 8 is rinsed with NMP/o-DCB (3 ml). The reaction is kept under vigorous stirring for 0.5 h at 20° C. and then temperature is raised gradually to 200° C. After 24 h the reaction is cooled to 20° C. and 5 ml of CHCl$_3$ is added to dilute the reaction mixture. The resulting solution is poured slowly into EtOH (150 ml) to precipitate desirable polymer 14. The precipitated solid is filtered off to give a pale-yellow powder. Polymer 14 is reprecipitated from CHCl$_3$ into EtOH and dried under reduced pressure at 120° C. for 10 h (720 mg, 74% yield after the second precipitation). $^1$H NMR (400 MHz; CDCl$_3$) δ ppm: 8.02-8.00 (br m, 2H, Ar), 7.90-7.84 (br m, 4H, Ar), 7.09 (br s, 2H, Ar), 6.84 (br s, 2H, Ar), 4.69-4.65 (br d, 2H, N—CH$_2$), 4.33 (br s, 2H, N—CH$_2$), 4.11-4.06 (br d, 2H, N—CH$_2$), 2.45 (br s, 6H, CH$_3$); IR (NaCl, CH$_2$Cl$_3$/cm$^{-1}$): 1774.7 (asym C=O), 1713.9 (sym C=O), 1388.0 (C—N), 748.2 (imide ring deformation); BET surface area=44 m$^2$/g; total pore volume=0.19 cm$^3$/g at (P/P$_0$) 0.98, adsorption; TGA analysis (nitrogen): initial weight loss due to thermal degradation commences at ~500° C.

EXAMPLE 5

A monomer comprising a bicyclic diamine structure and two nucleophilic groups 3,9-diamino-4,10-dimethyl-6H,12H-5,11-methanodibenzo[1,5]-diazocine may be prepared as indicated in reaction scheme 7. A dinitro derivative of 5,11-methanodibenzo[1,5]-diazocine catechol is made by mixing nitro-aniline with paraformaldehyde under acidic conditions (paraformaldehyde, trifluoroacetic acid, 20° C., 24 h) to form precursor 15, which may be reduced to produce monomer 16. The synthesis of monomer 16 is disclosed by Kiehne et al., (*Org. Lett.* 2007, 9, 1283)

Reaction scheme 7

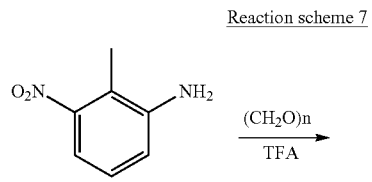

Monomer 16 may then be reacted with co-monomer 9 described in Example 2 as shown in Reaction Scheme 8 to form a desirable polymer 17 in accordance with the present invention.

Reaction Scheme 8

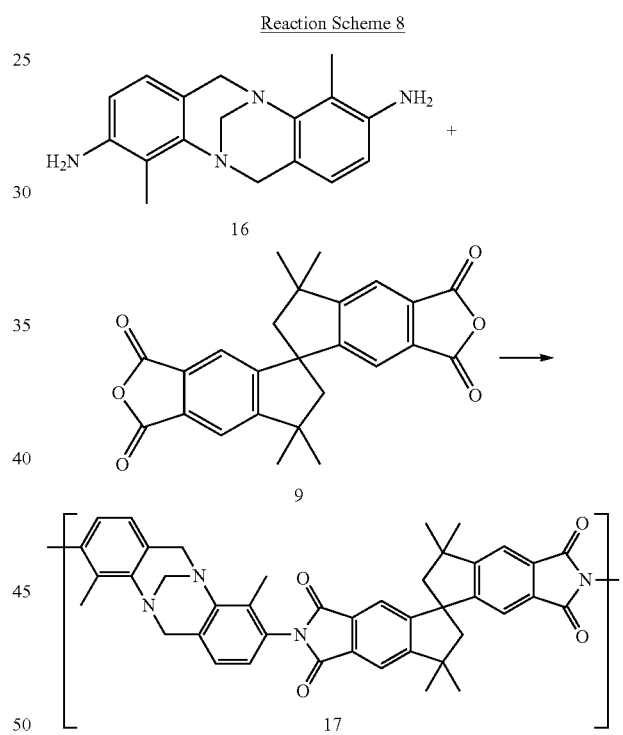

The reaction is carried out in a round bottom flask, equipped with Dean-Stark apparatus under nitrogen atmosphere. The monomer 9 (742.0 mg, 1.78 mmol) is dissolved in ethanol (EtOH) (12 ml) and triethylamine (1 ml) and refluxed for 1 h to form ester-acid precursor. Then the excess of solvent is distilled to give a highly viscous liquid. The comonomer 16 (500.0 mg, 1.78 mmol) is dissolved in NMP/o-diclorobenzene (o-DCB) mixture (3 ml, NMP/o-DCB=4:1) and added to ester-acid precursor. A container with comonomer 16 is rinsed with NMP/o-DCB (4 ml). The reaction is kept under vigorous stirring for 0.5 h at 20° C. and then the temperature is raised gradually to 200° C. After 24 h the reaction is cooled to 20° C. and 5 ml of CHCl$_3$ is added to dilute the reaction mixture. The resulting solution is poured slowly into EtOH (150 ml) to precipitate polymer 17. The precipitated solid is filtered off to give a pale-yellow powder. Polymer 17 is reprecipitated from chloroform into EtOH and dried under reduced pressure at 120° C. for 10 h (yield 873 mg, 74% after the second precipitation). $^1$H NMR (400 MHz; CDCl$_3$) δ (ppm) 7.80 (br s, 2H, Ar), 7.30 (br s, 2H, Ar), 6.91 (br s, 4H, Ar), 4.65 (br m, 2H, N—CH$_2$), 4.32 (br s, 2H, N—CH$_2$), 4.06 (br m, 2H, N—CH$_2$), 2.45 (br m, 4H, CH$_2$), 2.23 (br s, 6H, CH$_3$) 1.48 (br m, 12H, CH$_3$); IR (NaCl, CH$_2$Cl$_2$/cm$^{-1}$): 1774.0 (asym C=O), 1715.0 (sym C=O), 1383.6 (C—N), 732.8 (imide ring deformation); Molecular mass: (GPC, eluent—CHCl$_3$, against polystyrene standards: M$_w$=2600; BET surface area=395 m$^2$/g; total pore volume=0.59 cm$^3$/g at (P/P$_0$) 0.98, adsorption; TGA analysis (nitrogen): initial weight loss due to thermal degradation commences at ~435° C.

EXAMPLE 6

Monomer 16 described in Example 5 may be reacted with co-monomer 13 (Example 4) as shown in Reaction Scheme 9 to form a desirable polymer 18 in accordance with the present invention.

Reaction Scheme 9

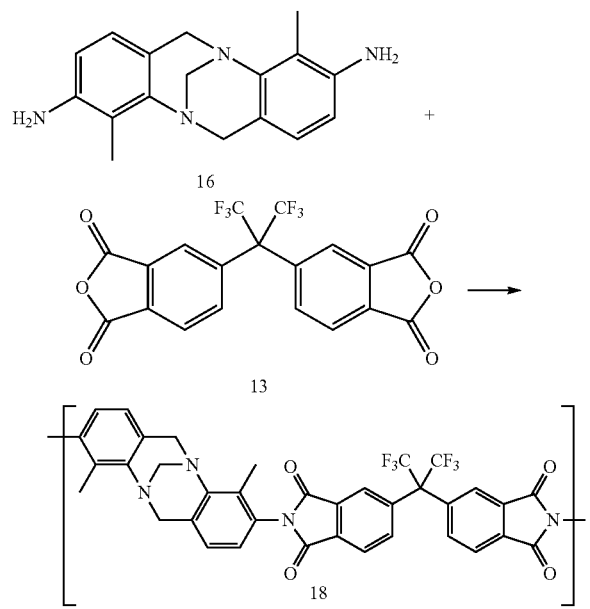

The reaction is carried out in a round bottom flask, equipped with Dean-Stark apparatus under nitrogen atmosphere. The co-monomer 13 (323.5 mg, 1.16 mmol) is dissolved in ethanol (EtOH) (8 ml) and triethylamine (0.6 ml) and refluxed for 1 h to form ester-acid precursor. Then the excess of solvents is distilled to give a high viscous liquid. The comonomer 16 (323.5 mg, 1.16 mmol) is dissolved in NMP/o-diclorobenzene (o-DCB) mixture (2 ml, NMP/o-DCB=4:1) and added to ester-acid precursor. A container with comonomer 16 is rinsed with NMP/o-DCB (3 ml). The reaction is kept under vigorous stirring for 0.5 h at 20° C. and then temperature is raised gradually to 200° C. After 24 h the reaction is cooled to 20° C. and 5 ml of CHCl$_3$ is added to dilute the reaction mixture. The resulting solution is poured slowly into EtOH (150 ml) to precipitate desirable polymer 18. The precipitated solid is filtered off to give a pale-yellow powder. Polymer 18 is reprecipitated from chloroform into EtOH and dried under reduced pressure at 120° C. for 10 h (yield 668 mg, 80% after the second precipitation). $^1$H NMR (400 MHz; CDCl$_3$) δ (ppm) 8.05-7.93 (br m, 6H, Ar), 7.26-6.94 (br m, 4H, Ar), 4.70-4.66 (br m, 2H, N—CH$_2$), 4.35 (br s, 2H, N—CH$_2$), 4.11-4.06 (br m, 2H, N—CH$_2$), 2.28 (br s, 6H, CH$_3$); IR (NaCl, (CH$_2$Cl$_2$/cm$^{-1}$): 1785.2 (asym C=O), 1723.7 (sym C=O), 1382.3 (C—N), 731.0 (imide ring deformation); Molecular mass: (GPC, eluent—CHCl$_3$, against polystyrene standards: M$_w$=16000, PDI=2.5; BET surface area=259 m$^2$/g; total pore volume=0.36 cm$^3$/g at (P/P$_0$) 0.98 adsorption; TGA analysis (nitrogen): initial weight loss due to thermal degradation commences at ~455° C.

EXAMPLE 7

A polymer comprising bicyclic diamine moieties can be modified by quaternisation of an amine group to form the ammonium cation. For example, the addition of dimethyl sulphate solution to the bicyclic diamine polymer 4 causes the formation of a ammonium cation with a halide counter-anion to give bicyclic diamine polymer 19. It is then possible to exchange the counter-anion as desired.

Reaction Scheme 10

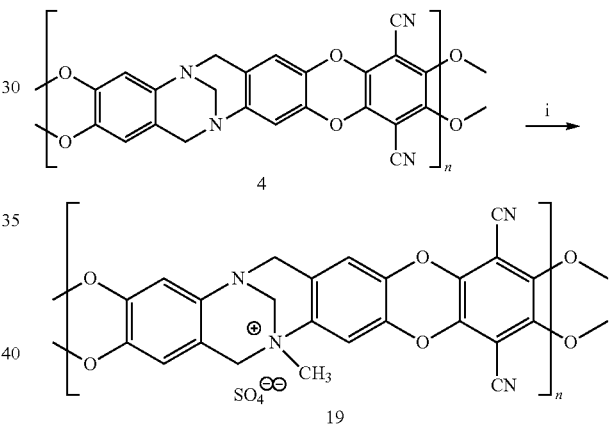

The polymer derived from 2,3,8,9-tetrahydroxy-6H,12H-5,11-methanodibenzo[1,5]-diazocine (500 mg, 1.22 mmol) was placed acetonitrile (10 mL) and dimethyl sulfate (1.54 g, 12.2 mmol) was added to the reaction mixture, which was left to stir at 20° C. for 24 h. The reaction was quenched with water, the resulting precipitate was collected under suction and washed with water to afford the desired polymer as a grey powder (475 mg, 92% based on the repeated unit). $^1$H NMR (400 MHz; DMSO-d6) δ 6.97 (br s, 2H), 6.85 (br s, 2H), 4.50 (br m, 6H), 2.89 (br s, 3H); TGA analysis (nitrogen): 13.80% loss of weight occurred at ~235° C., further loss due to thermal degradation commences at ~370° C.

Further examples of bridging groups which may be used instead of 2,3,5,6-tetrafluoroterephthalonitrile are shown below:

As can be seen, such bridging compounds comprise at least two pairs of leaving groups (a first pair and a second pair), each leaving group of a first pair being located on adjacent carbon atoms and each leaving group of a second pair being located on adjacent carbon atoms.

Referring to Example 2 above, further examples of co-monomers which may be used in lieu of the spiro compound to make a polymer in accordance with the polymer of the present invention are shown below:

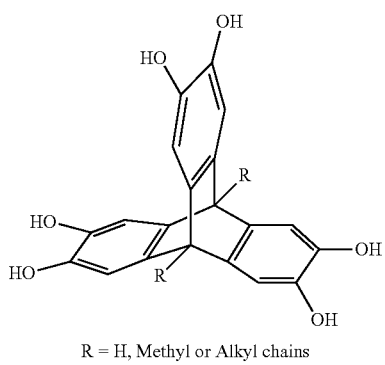

R = H, Methyl or Alkyl chains

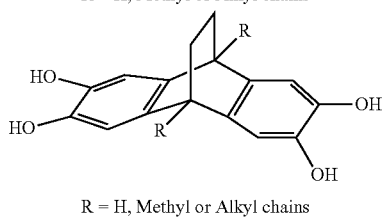

R = H, Methyl or Alkyl chains

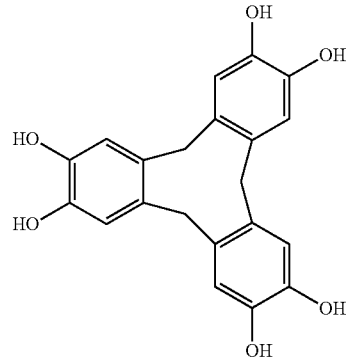

Referring to Example 3 above, further examples of co-monomers which may be used in lieu of the spiro compound to make a polymer in accordance with the polymer of the present invention are shown below:

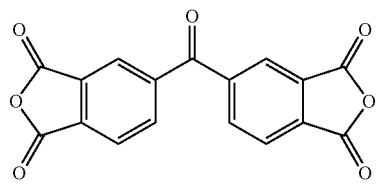

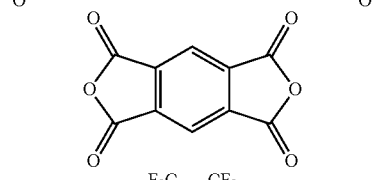

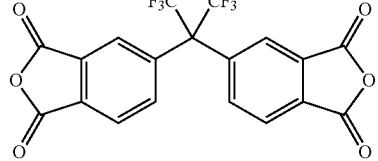

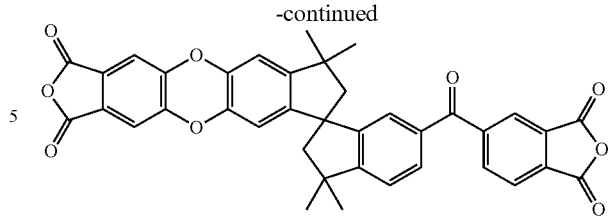

Where, in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims

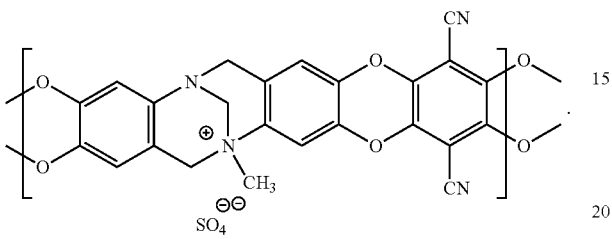

The invention claimed is:

1. A non-network polymer comprising a first repeat unit comprising a bicyclic diamine moiety or a quaternary ammonium cation derivative thereof,
    the first repeat unit comprising the bicyclic diamine moiety or quaternary ammonium cation derivative thereof being bonded to each of a second repeat unit and a third repeat unit with no more than one linkage,
    the second and third repeat unit being the same as, or different from, the first repeat unit and
    wherein
        the non-network polymer is linear and further wherein the non-network polymer has an average degree of polymerization of 10 or more.

2. The non-network polymer of claim 1, wherein the first repeat unit comprises general structure:

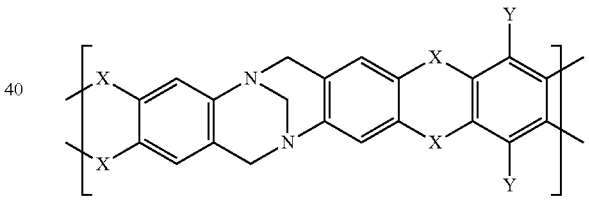

or its enantiomer,
or the quaternary ammonium cation derivative of the above structure or its enantiomer, which may be substituted or unsubstituted, and wherein
each Y is independently selected from the group consisting of H and CN;
each X is independently selected from the group consisting of O, S, NH and NR where R is a $C_1$ alkyl.

3. The non-network polymer of claim 2, wherein the first repeat unit comprises general structure:

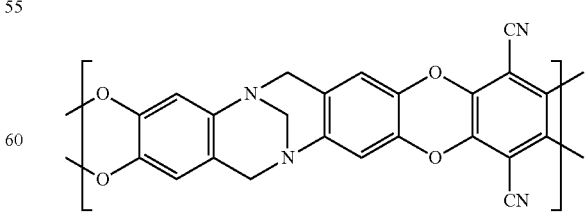

or its enantiomer,
or the quaternary ammonium cation derivative of the above structure or its enantiomer, which may be substituted or unsubstituted.

4. The non-network polymer of claim 2 wherein at least one of the second repeat unit and the third repeat unit further comprises general structure:

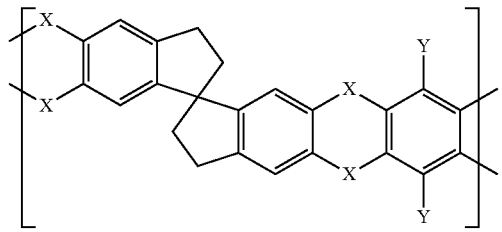

each Y is independently selected from the group consisting of H and CN;
each X is independently selected from the group consisting of O, S, NH and NR where R is a $C_1$ alkyl.

5. The non-network polymer of claim 4 wherein at least one of the second repeat unit and the third repeat unit further comprises general structure:

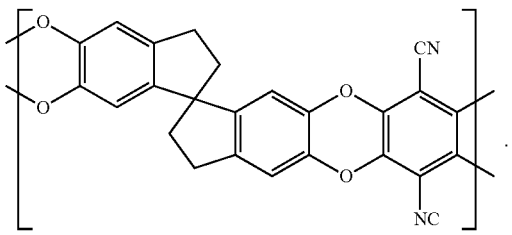

6. A non-network polymer comprising a bicyclic diamine moiety or a quaternary ammonium cation derivative thereof having a repeat unit which comprises:

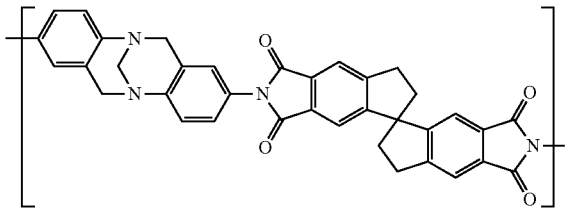

or its enantiomer,
or the quanternary ammonium cation derivative of the above structure or its enantiomer, which may be substituted or unsubstituted, and wherein
and wherein the non-network polymer has an average degree of polymerization of 10 or more.

7. The non-network polymer of claim 6 wherein the repeat unit comprises:

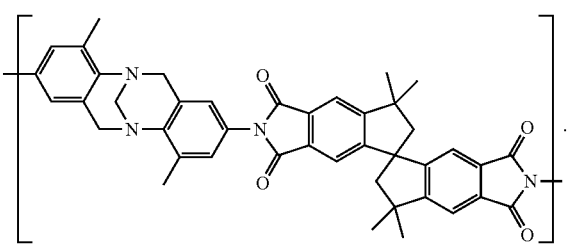

8. The non-network polymer of claim 6 wherein the repeat unit comprises:

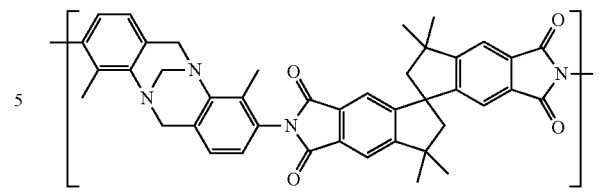

9. A non-network polymer comprising a bicyclic diamine moiety or a quaternary ammonium cation derivative thereof

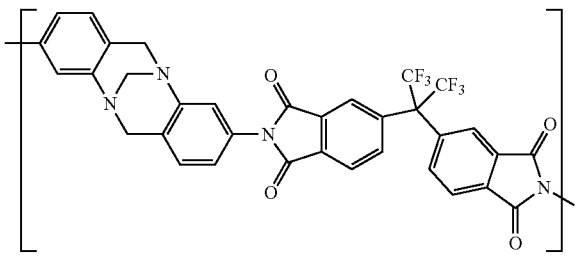

or its enantiomer,
or the quaternary ammonium cation derivative of the above structure or its enantiomer, which may be substituted or unsubstituted, and wherein
and wherein the non-network polymer has an average degree of polymerization of 10 or more.

10. The non-network polymer of claim 9 wherein the repeat unit comprises:

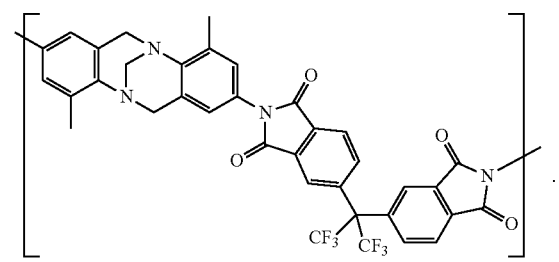

11. The non-network polymer of claim 9 wherein the repeat unit comprises:

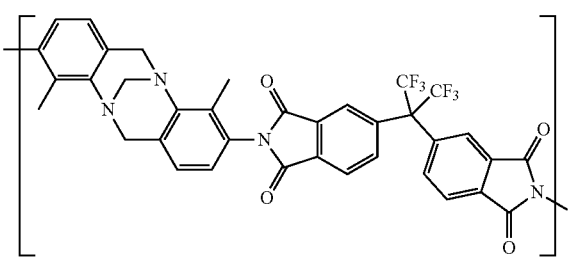

12. The non-network polymer of claim 2 wherein the first repeat unit comprises:

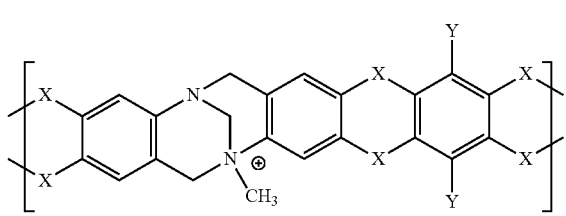

or its enantiomer, or the quaternary ammonium cation derivative of the above structure or its enantiomer, which may be substituted or unsubstituted, and wherein each Y is independently selected from the group consisting of H and CN;

each X is independently selected from the group consisting of O, S, NH and NR wherein R is a $C_1$ alkyl.

13. The non-network polymer of claim 12 wherein the first repeat unit comprises: